Nov. 24, 1931.  L. VON REIS  1,833,240
DEVICE FOR HANDLING SHEET GLASS
Filed March 28, 1930
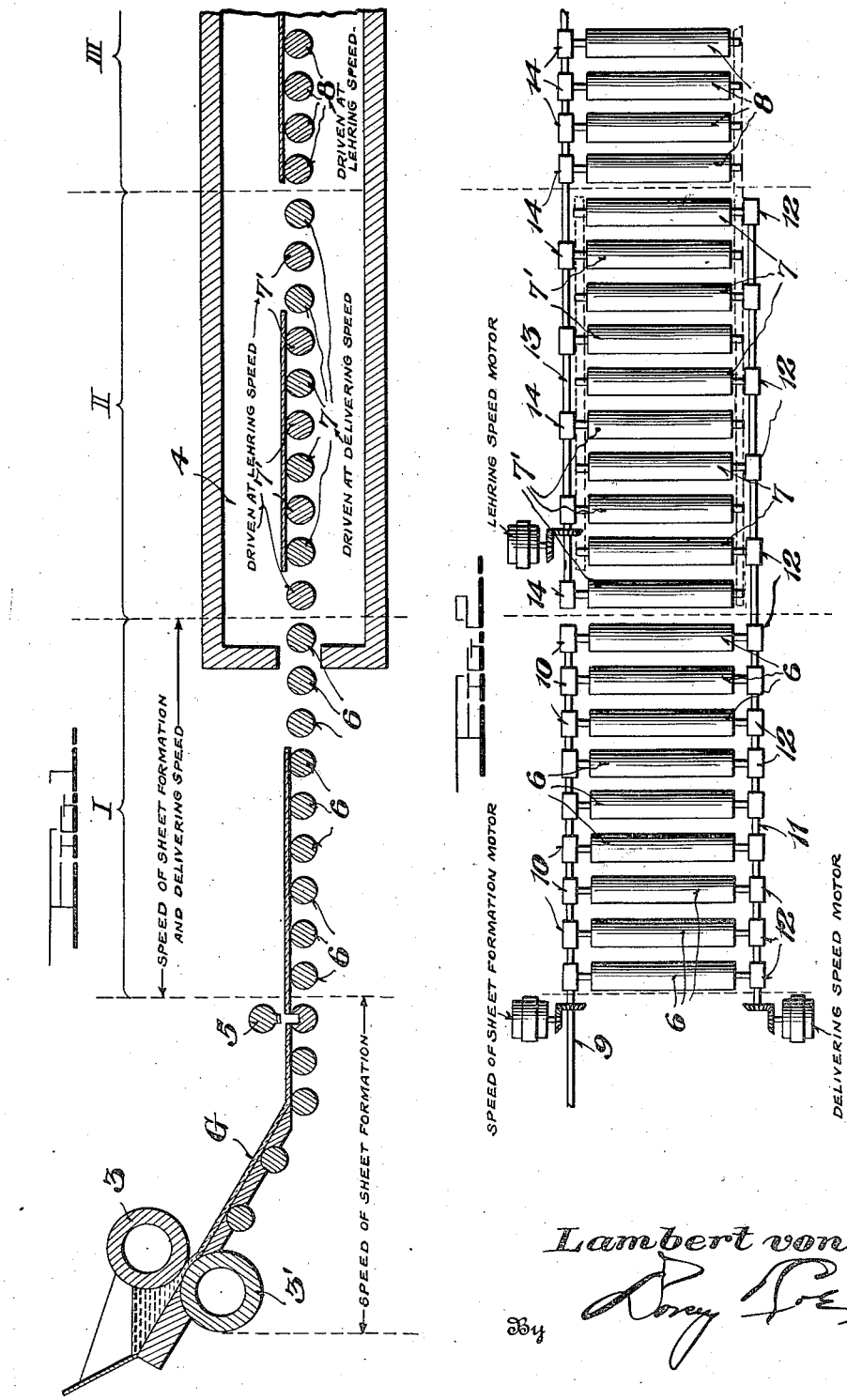

Patented Nov. 24, 1931

1,833,240

UNITED STATES PATENT OFFICE

LAMBERT von REIS, OF HERZOGENRATH, GERMANY, ASSIGNOR, BY MESNE ASSIGN-
MENTS, TO THE AMERICAN BICHEROUX COMPANY, A CORPORATION OF DELAWARE

DEVICE FOR HANDLING SHEET GLASS

Application filed March 28, 1930. Serial No. 439,777.

This invention relates to a device for making glass sheets and delivering them to a lehr, the same comprising a rolling machine on which glass ribbons are formed from a mass of liquid glass, and a roller bed which receives the glass ribbons from the forming machine and on which the ribbons are severed into sheets of desired length and then fed to the lehr.

The invention has for its object to so construct the roller conveyor of such devices as to allow them to deliver the glass sheets to the lehr with a high speed, so that they are exposed only a minimum length of time to the atmospheric temperatures, and yet reduce them from the high delivering speed to the lehring speed without in any way affecting the evenness and quality of the sheets.

To attain the object of the invention, the roller conveyor is divided into three successive sections of rollers adapted to be operated at different speeds. The rollers of the first section which is arranged immediately in advance of the cutting mechanism may be driven at the speed of sheet formation or at a higher speed. The second section of rollers in advance of the first one comprises two sets of alternating rollers the one set of which is driven at the high speed of the rollers of the first section and the other set at lehring speed or at a speed lower than lehring speed, means being provided on this section of the conveyor for allowing one of the two sets of rollers to run idle when the rollers of the other set are positively driven. The third section of rollers, which is disposed in immediate advance of the second section, has all of its rollers driven at lehring speed.

The device according to the invention possesses the advantage that it is much simpler in its construction and operation than the devices hitherto used for the same purpose.

In the drawings, Fig. 1 is a diagrammatic side elevation and Fig. 2 a diagrammatic plan view of one form of a device according to the present invention.

Referring to the drawings, 3 and 3' are forming rolls preferably of a Bicheroux forming machine, the glass ribbon G being formed in the pass between the rolls and fed to a roller bed which extends to and through the lehr 4. 5 is a cutting mechanism by which the ribbon is severed into sheets of the desired length. The rollers disposed between the forming rolls and the cutter are driven at a peripheral speed corresponding to the speed of sheet formation. In advance of the cutter 5 the roller conveyor is divided into three different sections of rollers I, II and III. The rollers 6 of the section I, which is disposed immediately in advance of the cutter 5, may be driven at the speed of sheet formation or at a higher speed, hereinafter called delivering speed. In the section II, rollers 7 which may be driven at the delivering speed of the rollers 6, alternate with rollers 7' which may be driven at lehring speed. The drives of the rollers 7 and 7' are provided with clutches or the like mechanisms which permit the rollers of one of the two sets 7, 7' to run idle when the rollers of the other set are being positively driven, that is to say when the rollers 7 are driven the rollers 7' run idle, and when the rollers 7' are driven the rollers 7 run idle. The purpose of this arrangement is to allow the sheets to be brought from the high delivering speed to the low lehring speed in a manner not affecting the evenness and quality of the glass. The rollers 8 of the section III, which is disposed in the lehr in advance of the section II, are driven at lehring speed.

The regulation of the speed of the several roller sections may be obtained by the aid of any suitable means, of which one kind is shown in Fig. 2. The mechanism for driving the rollers 6 at the speed of sheet formation comprises a shaft 9 which extends along one of the sides of the section I and which has preferably rotation imparted to it from the drive of the forming rolls 3, 3'. The shaft 9 transmits its rotation to the rollers 6 through individual gearings 10. These gearings are of such a construction that the rollers 6 can be connected with or disconnected from them either simultaneously or individually. Arranged along the opposite side of the roller conveyor is a shaft 11 with a drive of its own. This shaft serves to drive the rollers 6 with a peripheral speed higher than the speed of sheet formation and the rollers 7 with the same speed as the rollers 6. The shaft 11 extends throughout the length of the two sections I and II. Interposed between the shaft 11 and the rollers 6 and 7 are individual gearings 12 which may be coupled with and uncoupled from the rollers 6 and 7 either simultaneously or individually, as desired. Moreover, there is arranged on one of the conveyor sides along the sections II and III a third shaft 13 with a drive of its own. This shaft serves to drive the rollers 7' of section II and the rollers 8 of section III at lehring speed through the intermediary of individual gearings 14. The gearings 14 belonging to the section II are provided with one-way clutches which allow the rollers 7' to run idle when a glass sheet is being moved by the rollers 7 over the section II at the high delivering speed.

The drives on the section I are preferably provided with means which allow the rollers 6 to be individually reduced from the high delivering speed to the speed of sheet formation as soon as a glass sheet traveling on section I has passed by its tail end from over the individual rollers. This mechanism may be actuated either manually or automatically, for instance through electric circuits controlled by the traveling sheets themselves. In this way, the successively formed sheets can be delivered to the section I without any interruption, also in case a preceding sheet is still traveling on this section. Therefore, the successive sheets can follow each other closely without any appreciable space between them.

According to the structure illustrated on the drawings, the section I is located in the open air, while the sections II and III are arranged in enclosures, section III being located in the lehr. If desired section I may also be enclosed.

The operation of the device described is as follows: The glass ribbon G formed between the rolls 3, 3' moves at the speed of formation to the roller conveyor, passing beneath the cutter 5 onto the section I the rollers of which are at that time also being driven at the speed of sheet formation through the drive 9, 10. When a predetermined length of the ribbon G corresponding to the desired length of the sheets to be made has moved past the cutter 5, the latter acts to sever the first sheet from the portion of the ribbon behind the cutter. The rollers 6 of section I and the rollers 7 of the section II are now driven with a speed higher than the speed of sheet formation, the drive 9, 10 being simultaneously rendered inoperative either by disconnecting it from the rollers 6 or by the automatic action of one-way clutches which allow the rollers 6 to be rotated at the increased speed. The sheet cut off at 5 is rapidly moved at this increased speed from the section I to the section II, i. e. into the lehr. While the sheet is passing onto the section II, the rollers 7' between the rollers 7 are running idle. As soon as the sheet by its full length rests on the section II, the drive 11, 12 for the rollers 7 is cut out and the drive 13, 14 for the rollers 7' enters automatically into operation. The rollers 7' then feed the sheet at lehring speed from the section II to the section III, i. e. onto the lehr rollers 8 proper. During the time the rollers 7' are advancing the sheet with lehring speed, the rollers 7 are disconnected from the drive 11, 12 and run idle. In order to permit the next sheet to be delivered without any interval of time to section I after the cutting off of the first sheet, each individual roller 6 is reduced to the speed of sheet formation by disconnecting it from the drive 11, 12 as soon as the tail of the first sheet has passed from over such roller. The described cycle of operation repeats for the second and all following sheets.

Having thus described my invention, what I claim as new and desire to secure by Letters Patent is:—

A device for forming glass sheets and delivering them to a lehr, comprising in combination a mechanism for forming a glass ribbon, a roller bed for receiving this ribbon extending from the forming mechanism to and through the lehr, a cutter on the roller bed in advance of the forming mechanism for severing the ribbon into sheets of desired length, a roller section for variable speeds in advance of the cutter, a drive for rotating the rollers of this section at the speed of sheet formation, another drive for rotating these rollers at a speed higher than that of sheet formation, means for reducing the individual rollers of this section from the high speed to the speed of sheet formation as soon as the tail of a sheet traveling on the section passes from over the individual rollers, a second section of rollers in advance of the first one consisting of two sets of alternating rollers one set of which is adapted to be driven at the high speed of the rollers of the first section and the other set at lehring speed, means for allowing the rollers of one of the two sets to run idle when the other is being positively driven, and a third section of rollers in advance of the second one all rollers of which are designed to be driven at lehring speed, for the purpose specified.

In testimony whereof I have signed my name to this specification.

LAMBERT von REIS.